United States Patent [19]
Rogler

[11] Patent Number: 5,469,629
[45] Date of Patent: Nov. 28, 1995

[54] BRAKE ROTOR THICKNESS MEASUREMENT GAGE

[75] Inventor: Albert C. Rogler, North Scituate, R.I.

[73] Assignee: Central Tools, Inc., Cranston, R.I.

[21] Appl. No.: 252,900

[22] Filed: Jun. 2, 1994

[51] Int. Cl.$^6$ .................................................. G01B 7/06
[52] U.S. Cl. ................................ 33/831; 33/784; 33/609
[58] Field of Search .............................. 33/831, 826, 600, 33/609, 610, 784

[56] References Cited

U.S. PATENT DOCUMENTS

| 280,339 | 7/1883 | Barnes | 33/831 |
|---|---|---|---|
| 517,073 | 3/1894 | Sloane | 33/831 |
| 536,676 | 4/1895 | Wilcox | 33/826 |
| 3,618,219 | 11/1971 | Kelly | 33/609 |
| 3,691,640 | 9/1972 | McFarland et al. | 33/609 |
| 3,854,216 | 12/1974 | Mosher | 33/609 |
| 3,889,378 | 6/1975 | Senecal | 33/610 |
| 5,029,402 | 7/1991 | Lazecki et al. | 33/784 |
| 5,095,638 | 3/1992 | David et al. | 33/784 |
| 5,345,692 | 9/1994 | Babitchenko | 33/826 |

*Primary Examiner*—Christopher W. Fulton

[57] ABSTRACT

A gage includes an elongate support arm at the end of a bar on which there is mounted a measurement and display module. A sliding anvil arm is spaced from the bar in parallel relationship and mounted on the module for sliding movements therewith on the bar. A right angle support arm extends from the free end of the elongate support arm, anvils being mounted on the free end support portion of the right angle support arm and at the end of the sliding anvil arm, both the anvils being arranged along a measurement axis. The support portion of the right angle support arm and the anvil mounted thereon together have a dimension along the measurement axis no greater than the smallest anticipated space between a wheel and a rotor to be measured so that the anvil may be positioned on one side of the rotor while the sliding anvil arm together with the module can be brought into abutment against the other side of the rotor to provide a reading of the thickness of the rotor without removal of the wheel from the vehicle.

17 Claims, 2 Drawing Sheets

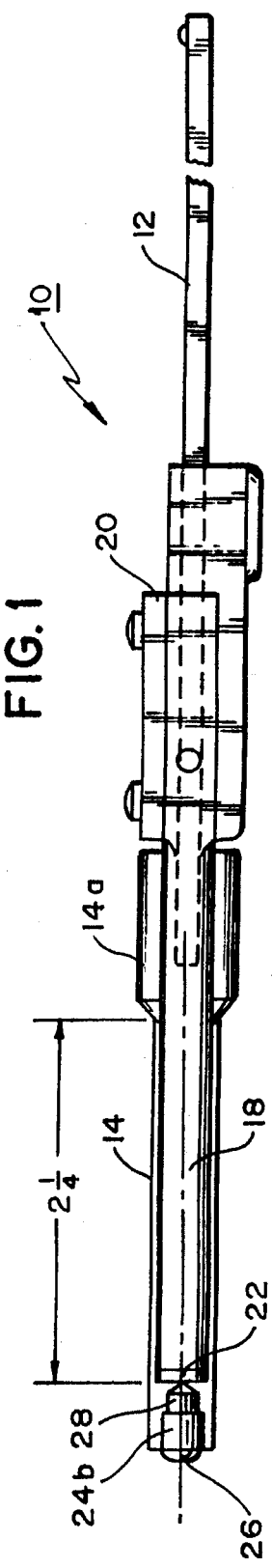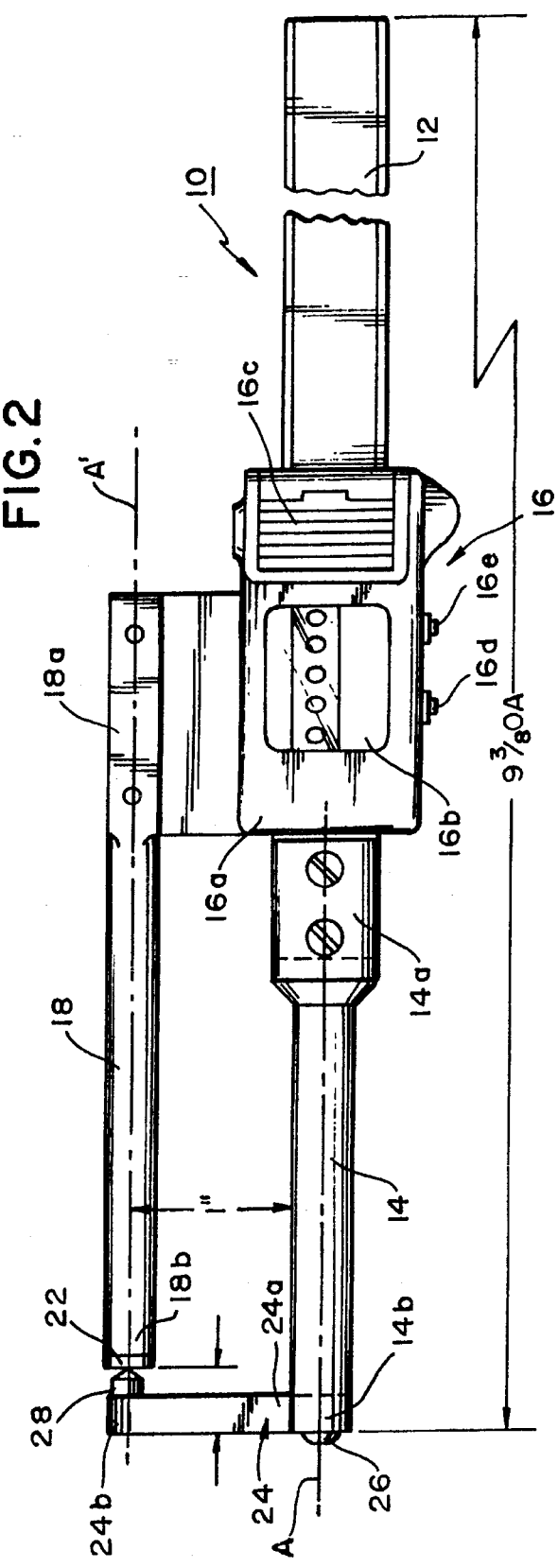

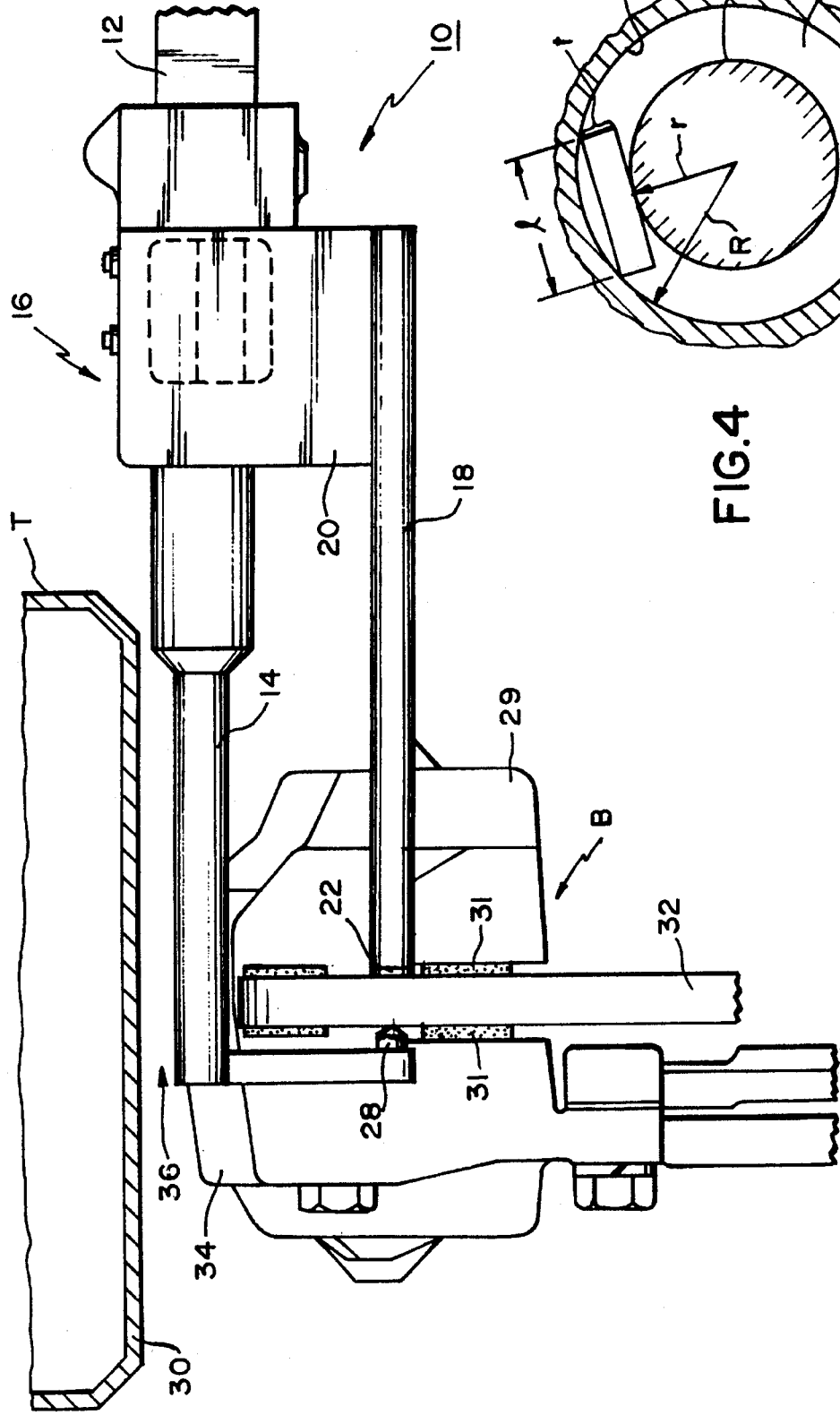

BRAKE ROTOR THICKNESS MEASUREMENT GAGE

BACKGROUND OF THE INVENTION

The present invention generally relates to measuring instruments, and more specifically to a brake rotor thickness measurement gage.

Traditionally, to measure the thickness of a brake rotor of a motor vehicle, the wheel must be removed in order to provide convenient access to the rotor with conventional measurement gages. When performed in a garage, for example, the car must be at least partially jacked up, the bolts holding the wheel in place be removed. It is only after the wheel is removed that the rotor can be measured. Outside of the garage, without the benefit of a jack or lift, it is difficult, if not impossible, to make the measurement. Either way, the checking of brake rotors becomes a time consuming procedure since the wheels must subsequently be replaced after the measurements have been taken.

With currently available measurement gages, therefore, the measurement of the thickness of the rotors must usually be conducted at a service center where equipment for quickly and conveniently removing the wheels is available. Many states have programs for spot checking the brake rotor thicknesses of transport vehicles by the authorities. Such programs have, however, been hampered and slowed down by the difficulty in obtaining convenient access to the brake rotors in the field.

SUMMARY OF THE INVENTION

Accordingly, it is an object of the present invention to provide a gage which does not possess the disadvantages inherent in prior art gages for the measurement of brake rotor thicknesses.

It is another object of the present invention to provide a brake rotor thickness measurement gage which is simple in construction and economical to manufacture.

It is still another object of the present invention to provide a gage of the type suggested in the previous objects which can be used at a full service facility or in the field.

It is yet another object of the present invention to provide a gage for the measurement of brake rotor thickness as in the previous object which can be easily and conveniently used by both experienced mechanics and non-experts.

In order to achieve the above objects, as well as others hereafter, a gage in accordance with the present invention can be used to measure the thickness of a vehicle wheel brake rotor without removing the wheels from the vehicle, wherein the rotor brake assembly is spaced to form a predetermined space from the wheel. The gage comprises an elongate bar defining the gage axis. An elongate support arm extends outwardly from one end of said bar along said bar axis and has a free end at a point remote from said bar. A measurement and display module means is provided slidably mounted on said bar for providing indications of relative movements of said module means relative to said bar. An elongate anvil arm is provided, one end of which is mounted on said module means for sliding movements therewith, said elongate anvil arm being arranged along a measurement axis offset from and substantially parallel to said support arm and said bar. A first anvil is mounted at the other end of said elongate arm. A second anvil is provided, and support means is provided on said support arm and having a support portion arranged on said measurement axis for supporting said second anvil along said measurement axis. Said support means having a dimension between said gage and measurement axes to permit passage through said predetermined space. In this manner, said second anvil can be inserted between the wheel and rotor and placed into contact with one side of the rotor without removing the wheel and the thickness of the rotor can quickly and conveniently be measured by placing said first anvil into contact with the other side of the rotor.

BRIEF DESCRIPTION OF THE DRAWINGS

The features and advantages of the present invention will become apparent from the following description of the invention, taken together with the accompanying drawings.

FIG. 1 is a top plan view of a brake rotor thickness measurement gage in accordance with the present invention;

FIG. 2 is a side elevational view of the gage shown in FIG. 1;

FIG. 3 is a side elevational view of the gage shown in FIGS. 1 and 2 and indicating the manner in which the gage is used to measure the thickness of a brake rotor; and FIG. 4 is a diagramatic drawing which depicts the limitation on the size of the gage.

DESCRIPTION OF THE PREFERRED EMBODIMENT

Referring now specifically to the Figures, in which identical or similar pans are designated by the same reference numerals throughout, the gage in accordance with the present invention is generally designated by the reference numeral 10.

The gage 10 includes an elongate bar 12 defining a gage axis A. An elongate support arm 14 extends outwardly from one end of the bar 12 as shown along the bar axis A. The support arm 14 can be connected to the bar 12 in any suitable or conventional way. In the preferred embodiment, the bar 14 has an enlarged slotted end 14a, the slot being dimensioned to receive the bar 12 as shown.

The support arm 14 has a free end 14b at a point remote from the bar 12. While the length of the support arm 14 is not critical, it should be long enough so that it can go around the rotor without obstructions. Typically, the length of the elongate support arm 14 is 2–3 inches.

A measurement and display module 16 is slidably mounted on the bar 12 for providing indications of relative movements of the module in relation to the bar. Such measurement and display modules are known and described, for example, in U.S. Pat. No. 4,972,603. Such a module, which cooperates with the bar 12 which is provided with capacitive circuit means on a surface thereof, includes a housing 16a, a digital display 16b and a battery cover 16c. Protruding buttons 16d and 16e are provided for actuating internal switches, the button 16d being provided for changing the measured quantities between millimeters and inches, while the button 16e can be used to zero the display during initial calibration. Such modules are, as indicated, conventional and any other measurement and display module can be used.

An elongate anvil arm 18 is provided, one end of which is mounted on the module 16 for sliding movements therewith relative to the bar, the elongate anvil arm 18 being spaced from the module 16 by means of a support plate 20. The elongate anvil arm 18 defines a measurement axis A' offset from and substantially parallel to the support arm 14 and the gage axis A. The end 18a of the anvil arm is attached to the support plate in any conventional manner. A first anvil 22 is mounted on the other end 18b of the anvil arm.

On the other or remote free end 14b of the support arm 14 there is mounted a right angle support arm 24 attached in any conventional way to the support arm 14, such as with bolt 26. The free end 14b is preferably slotted so as to receive the right angle support arm and prevent relative rotation of the right angle support arm 24 about axis A.

Referring to FIG. 3 a portion of a rotor brake assembly B is shown, which includes a caliper 29 surrounded by a wheel 30 on which a tire T is mounted. The rotor 32 is at least partially received within the caliper 29 where the rotor is engaged by pads 31. The outer peripheral portion 34 of the rotor 32 forms a generally annular space or clearance 36. Referring to FIG. 4, a side view of the wheel 30 and rotor 32 are schematically shown, which suggests the generally annular space 36. While the space between the wheel wheel 30 and the brake assembly B is not nearly as annular as depicted, the schematic of FIG. 4 is helpful to define limiting parameters or dimensions inherent in wheel constructions. Where the inside diameter of the wheel 30 is R and the outside diameter of the rotor 32 is r, the maximum length l of the angle support arm 24 of the tool can be computed from the geometry for a given thickness t of the right angle support arm 24 and is approximately equal to:

$$l \cong 2\sqrt{R^2 - (r+t)^2}$$

It is clear that the shorter the length I, the more versatile the gage since it can be inserted into smaller annular spaces 36. For relatively small values of t, the radius r of the rotor 32 can be approximated by $$r = R - t$$

If l=1.5" and t=0.25", typical relative values of R and r can be computed. Therefore, if the diameter R of the wheel 30 is 6", the diameter of the rotor can be as much as approximately 5.75" in diameter. Similarly, if R=10", r can be as high as approximately 9.75" and if R=16", r can be as high as approximately 15.75". It will be noted, therefore, that the gage can be inserted into very narrow annular spaces and should be capable of measuring brake rotor thickness in almost all vehicle makes and models.

It is clear from the described construction that the length l of the angle support arm 24 is relatively small in comparison to the potential maximum separation between the anvils 22, 28, which is not a function of the length of the angle support arm 24 but the length of the bar 12.

The anvil 22 may be integrally formed with the anvil arm 18 or may be a separate part which is attached to the free end of the anvil arm in any suitable or conventional manner, such as by engaging an externally threaded axial extension (not shown) on the anvil into an internally threaded bore at the end of the anvil arm. The anvil 28 can similarly be secured to the upper support portion 24b of the right angle support arm 24.

The specific configurations of the anvils 22, 28 is not critical. In the embodiment shown, the anvil 22 presents a flat surface to the rotor, while the anvil 28 presents a pointed service. However, both anvils may be similarly configured or reversed.

The distance between the gage axis A and the measurement axis A' is not critical, but be maintained relatively low for the reason discussed above. It has been determined that a spacing of approximately one inch between these axis serves the purpose in most applications and renders the tool relatively compact. However, it will be appreciated that the gages can be generally scaled up or down in dimensions depending on the class of vehicles for which they are intended. For very large trucks, it may be desirable to make the gage somewhat larger, while a smaller gage may be adequate for smaller vehicles.

I claim:

1. Gage for measuring the thickness of a vehicle wheel brake rotor without removing the wheel from the vehicle, wherein the rotor brake assembly is spaced from the wheel to form a predetermined space, the gage comprising an elongate bar defining a gage axis; an elongate support arm extending outwardly from one end of said bar along said gage axis and having a free end at a point remote from said bar; measurement and display module means slidably mounted on said bar for providing indications of relative movements of said module means on said bar; an elongate anvil arm one end of which is mounted on said module for sliding movements therewith, said elongate anvil arm being arranged along a measurement axis offset from and substantially parallel to said support arm and said bar; a first anvil mounted at the other end of said elongate anvil arm; a second anvil; support means on said support arm extending in the direction of said measurement axis and having a support portion arranged on said measurement axis for supporting said second anvil along said measurement axis, said second anvil having a pointed end pointed in the direction of said first anvil, said support means having a dimension between said gage and measurement axes to permit passage through said predetermined space, whereby said second anvil can be inserted between the wheel and rotor and placed into contact with one side of the rotor without removing the wheel and the thickness of the rotor can be quickly and conveniently measured to determine wear at a plurality of rotor positions by placing said first anvil into contact with the other side of the rotor.

2. Gage as defined in claim 1, wherein said measurement and display means includes a digital display.

3. Gage as defined in claim 1, wherein said first anvil is integrally formed with said elongate anvil arm.

4. Gage as defined in claim 1, wherein said first anvil is detachably connected to said elongate anvil arm.

5. Gage as defined in claim 1, wherein said first anvil has a flat surface for contacting the rotor.

6. Gage as defined in claim 1, wherein said second anvil has a pointed end for contacting the rotor.

7. Gage as defined in claim 1, wherein said support means comprises a right angle arm mounted on said elongate support arm.

8. Gage as defined in claim 7, wherein said support means comprises a right angle arm detachably connected to said elongate support arm.

9. Gage as defined in claim 8, wherein said right angle arm is approximately 1–2 inches long.

10. Gage as defined in claim 8, wherein said predetermined space is generally annular in shape, and said right angle arm has a length no greater than approximately $$l \cong 2\sqrt{R^2 - (r+t)^2}$$

wherein l is the length of said right angle arm, t is the thickness of said right angle arm along a direction transverse to its length direction, R is the outer diameter of said annular shape representing the wheel wheel and r is the inner diameter of said annular shape representing the outer dimension of the rotor brake assembly.

11. Gage as defined in claim 1, wherein said elongate support arm is approximately 2–3 inches long.

12. Gage as defined in claim 1, wherein said elongate anvil arm is offset from said support arm a distance approximately 1 inch.

13. Gage as defined in claim 1, wherein the said bar and elongate support arm mounted thereon has a total length of approximately 9–10 inches.

14. Gage as defined in claim 1, wherein said second anvil is detachably connected to said support portion of said support means.

15. Gage as defined in claim 1, wherein said support portion of said support means and anvil together have a dimension along said measurement axis which is within the range of 1–3 inches.

16. Gage as defined in claim 1, wherein said elongate anvil arm has a length to insure contact and zero opening between said first and second anvils when said measurement and display means is sliding moved on said bar to a position proximate to said elongate support arm, whereby said measurement and display module can be calibrated for an initial setting.

17. Gage as defied in claim 9, wherein said right angle arm is approximately 1.5 inches long.

\* \* \* \* \*